US008566287B2

(12) United States Patent
Bansal et al.

(10) Patent No.: US 8,566,287 B2
(45) Date of Patent: Oct. 22, 2013

(54) METHOD AND APPARATUS FOR SCHEDULING DATA BACKUPS

(75) Inventors: Ajay Bansal, Bangalore Karnataka (IN); Gopakumar Ambat, Bangalore Karnataka (IN); Subramariam Venkata Kalambur, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 110 days.

(21) Appl. No.: 12/748,467

(22) Filed: Mar. 29, 2010

(65) Prior Publication Data

US 2011/0191777 A1    Aug. 4, 2011

(30) Foreign Application Priority Data

Jan. 29, 2010   (IN) .............................. 232/CHE/2010

(51) Int. Cl.
*G06F 17/30*    (2006.01)
(52) U.S. Cl.
USPC ............................ 707/654; 707/648; 707/653
(58) Field of Classification Search
USPC .................. 707/618, 655, 668, 682, 999.204, 707/640–654, 661, 685, 751; 718/102–105; 714/E11.12; 711/162
See application file for complete search history.

(56) References Cited

U.S. PATENT DOCUMENTS

| 6,434,631 | B1* | 8/2002 | Bruno et al. ....................... 710/6 |
| 6,983,352 | B2* | 1/2006 | Keohane et al. ............. 711/162 |
| 7,665,090 | B1* | 2/2010 | Tormasov et al. ............ 718/104 |
| 8,176,271 | B2* | 5/2012 | Srivastava et al. ............ 711/162 |
| 2003/0074387 | A1* | 4/2003 | Tanaka .......................... 709/103 |
| 2003/0120689 | A1* | 6/2003 | Yamanaka et al. ............ 707/205 |
| 2006/0259724 | A1* | 11/2006 | Saika ............................ 711/162 |
| 2007/0094312 | A1* | 4/2007 | Sim-Tang ..................... 707/204 |
| 2008/0263551 | A1* | 10/2008 | Ali et al. ....................... 718/102 |
| 2009/0077557 | A1* | 3/2009 | Ichikawa et al. .............. 718/102 |
| 2010/0138391 | A1* | 6/2010 | Namikawa et al. ........... 707/640 |

* cited by examiner

*Primary Examiner* — Greta Robinson

(57) ABSTRACT

An apparatus and computer-executed method for scheduling data backups may include accessing a specification for a backup job. The specification may include an identification of a data source, a start time and a target storage device to which backup data should be written. A first history of past backup jobs that specify the data source, and a second history of past backup jobs that specify the target storage device, may be identified. Using the first history, an expected size of the backup data may be computed. Using the second history, an expected rate at which the backup data may be written to the target storage device may be computed. Using the expected size, the expected rate and the start time, an expected completion time for the backup job may be computed.

20 Claims, 5 Drawing Sheets

METHOD AND APPARATUS FOR SCHEDULING DATA BACKUPS

RELATED APPLICATIONS

Benefit is claimed under 35 U.S.C. 119(a)-(d) to Foreign application Serial No. 232/CHE/2010 entitled "METHOD AND APPARATUS FOR SCHEDULING DATA BACK-UPS" by Hewlett-Packard Development Company, L.P., filed on Jan. 29, 2010, which is herein incorporated in its entirety by reference for all purposes.

BACKGROUND

It is standard practice in enterprise information technology ("IT") environments to backup regularly all of the data that is important for supporting business operations. For example, databases must be backed up regularly because their contents change on a daily basis, as do the contents of email servers and the like. The purpose of making backups of such storage repositories is to provide a fall-back copy of critical data in the event data is lost in the production environment.

One of the problems that present themselves in the context of making data backups is ensuring the availability of appropriate target storage devices for receiving the data generated when a backup job runs. A human administrator typically schedules each backup job by specifying the source data to be backed up, a start time when the backup should be taken and a target device to which the backup data should be written. But the duration of backup jobs can vary quite dynamically in practice. The size of a backup, even for the same data source, can change over time because the data in the source repository can grow or shrink as, for example, the tables in a database are populated and purged. And the rate of progress for a backup job can vary over time as, for example, bandwidth demands over the relevant network increase or decrease.

Consequently, it has become quite difficult for human administrators to predict when a given target storage device will be free, in large part because it has become difficult to know when a backup job utilizing a given target device will be completed.

DETAILED DESCRIPTION

Figure 1:
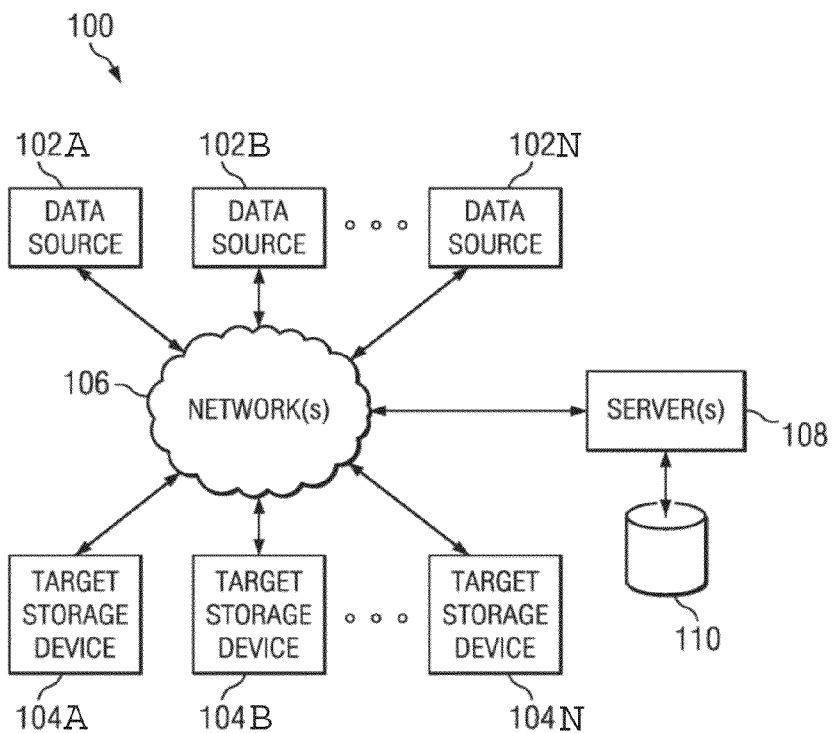
FIG. 1 is a block diagram illustrating an example system suitable for scheduling and executing data backups in accordance with embodiments of the invention.

FIG. 1 illustrates an example system 100 suitable for scheduling and executing data backups in accordance with embodiments of the invention. System 100 may include multiple data sources 102A, 102B . . . 102N (referred to as data source(s) 102) and multiple target data storage devices 104A, 104B . . . 104N (referred to as target storage device(s) 104), each of which may be interconnected by means of one or more networks or other switching fabrics 106. Also connected to networks 106 is one or more server computer systems 108. Server computer systems 108 may also contain or have access to one or more tangible computer-readable storage mediums such as disk device 110.

Data sources 102 need not all be of the same type. Indeed, in practice, data sources 102 will typically vary in type. For example, in an enterprise IT environment, data sources 102 might take the form of database server clusters, email servers, desktop computers and the like. Similarly, target storage devices 104 may vary in type. One might be a magnetic disk drive or a set of magnetic disk drives managed by a host to present disk blocks or entire file systems to clients. Others might be tape drives, while still others might be optical disk drive devices. Other types of storage devices may also be used. Networks 106 may take any conventional form, including without limitation the Internet, an intranet, a local area network, a backplane or switching fabric internal to a host computer, a fibre channel network or any combination of the foregoing. The host computing devices supporting servers 108 may also take any conventional forms. And storage mediums 110 may take any conventional form such as magnetic disks, optical disks, flash memory, system memory or the like.

Figure 2:
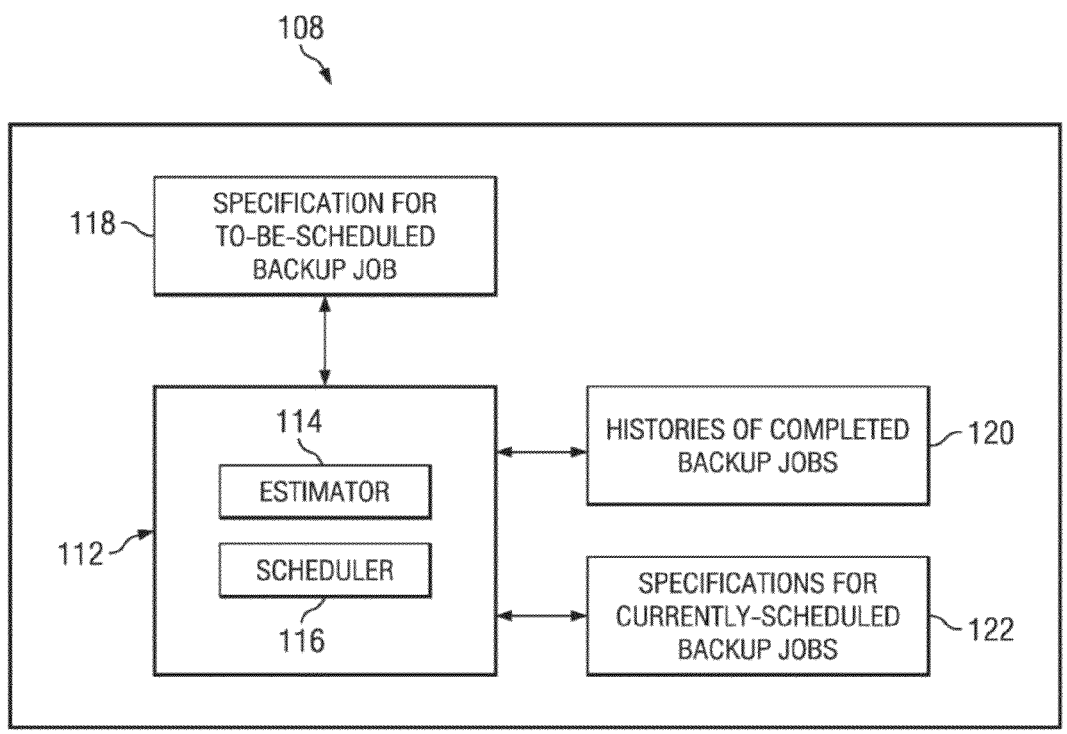
FIG. 2 is a block diagram illustrating components contained in and implemented by the server of FIG. 1.

FIG. 2 illustrates example components that may be contained in and/or implemented by servers 108. It is also possible for one or more of the components of FIG. 2 to be contained in and/or implemented by any of the other components of FIG. 1, including for example data sources 102 or target storage devices 104. And the components illustrated in FIG. 2 need not be implemented discretely as shown; rather, one or more of them may be integrated together into unified modules if desired. They need not all reside on the same host.

Backup server 112 may include at least an estimator component 114 and a scheduler component 116. Backup server 112 may have access to a specification 118 for a to-be-scheduled backup job, a repository 120 of histories of completed backup jobs, and a repository 122 of specifications for currently-scheduled backup jobs.

Figure 3:
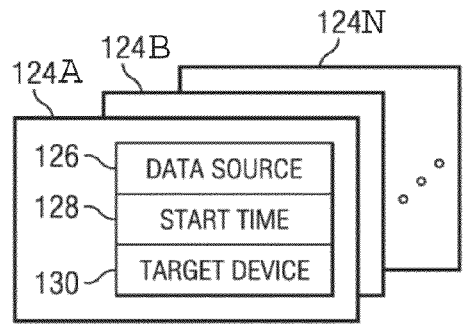
FIG. 3 is a block diagram illustrating specifications for currently-scheduled backup jobs according to FIG. 2.

FIG. 3 illustrates example contents of repository 122. Each specification 124A, 124B . . . 124N (collectively referred to herein as specification(s) 124) for a currently-scheduled backup job corresponds to a job that either has not yet started or that has not yet been completed. Typically, each specification 124 would include an identifier 126 of a data source, an identifier 128 of a start time for the backup job, and an identifier 130 of a target storage device to which backup data for the backup job should be written. Other kinds of information may also be included in each specification.

Figure 4:
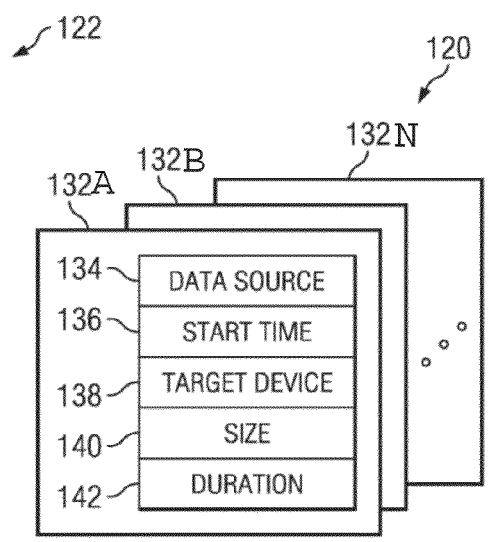
FIG. 4 is a block diagram illustrating histories of completed backup jobs according to FIG. 2.

FIG. 4 illustrates example contents of repository 120. Each history 132A, 132B . . . 132N (collectively referred to herein as history(ies) 132) in repository 120 may correspond to a past backup job that has already been completed. Because each of the jobs in repository 120 has been completed, additional information will be available for each. For example, like repository 122, each history 132 may include indicators 134, 136 and 138 or a data source, a start time and a target device. But each history 132 may also include information such as the size 140 of the data that was backed up when the job was run (e.g. a number of megabytes or gigabytes), and the duration 142 of the backup operation. Instead of a duration, equivalently a stop time for the backup operation might be included so that the duration job may be inferred from the start and stop times. A completion rate for the backup job may be explicitly recorded in each history 132, or the completion rate may be inferred from size and duration information.

Figure 5:
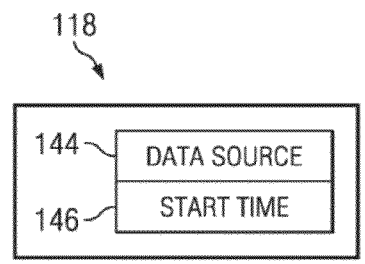
FIG. 5 is a block diagram illustrating a specification for a to-be-scheduled backup job according to FIG. 2.

FIG. 5 illustrates example contents of a specification 118 for a to-be-scheduled backup job. Typically such a specification will include at least an identifier 144 of a data source and an identifier 146 of a start time (e.g. a date and a time) for the backup job. A specification 118 might also include other information such as a desired target storage device.

Figure 6:
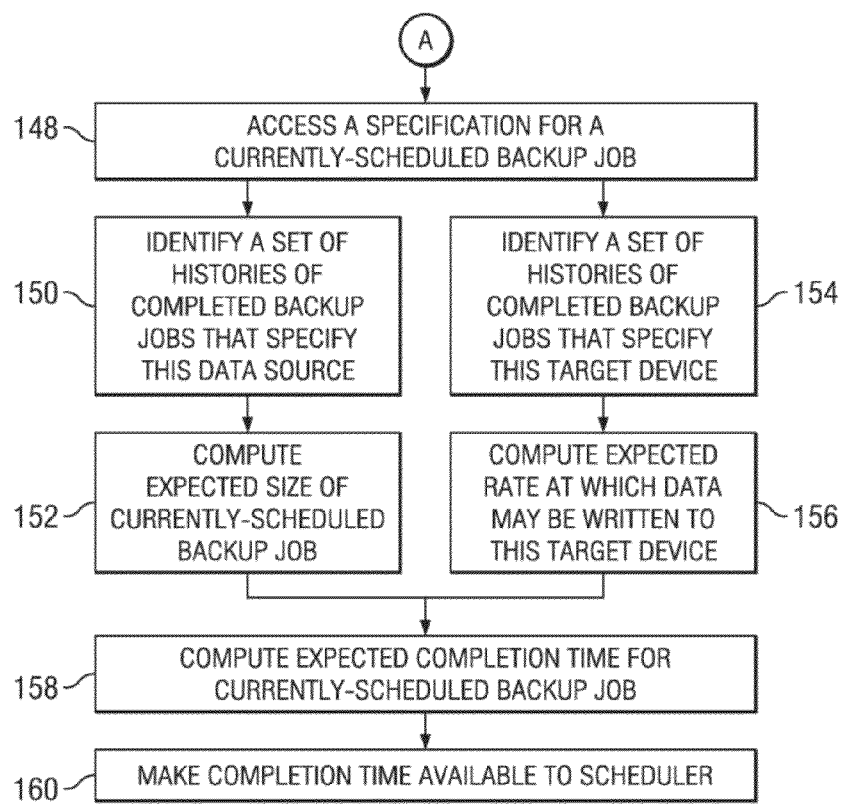
FIG. 6. is a flow diagram illustrating example behavior of the components of the server of FIG. 2 when scheduling data backups according to embodiments of the invention.

FIG. 6. illustrates example behavior of backup server 112 when scheduling data backups according to embodiments of the invention. In general, the steps shown in FIG. 6 may typically take place in the context of scheduling a new backup job. For example, a new backup job may already have a data source and a start time specified, and server 112 may select an appropriate target device for the new backup job. Or the new backup job may already specify a target device, and server 112 may select an appropriate start time given the constraints of the specified data source and target device. The steps of FIG. 6 may take place in other contexts as well.

Given a to-be-scheduled backup job 118, the task is either to select a target device or a start time for the new job. To do so, server 112 may estimate when some target device will be free to receive data from the new job. Thus, FIG. 6 describes a method for determining when a particular target storage device will be free. In step 148, server 112 accesses a specification 124 for a currently-scheduled backup job. It then computes an expected completion time for the currently-scheduled backup job. It may do so by computing both an expected size for the currently-scheduled backup job and an expected completion rate for the currently-scheduled backup job. It may compute the size and the rate serially or in parallel. To compute the size, server 112 may identify, in step 150, a set of relevant histories from repository 120 that have specified the same data source as does the currently-scheduled backup job. To make the set even more relevant, it may further reduce the set to include only histories that share other attributes with the currently-scheduled backup job. For example, if the job to be estimated is a full backup, then histories may be chosen for full backups. But if the job to be estimated is a partial backup, then histories for partial backups may be chosen. Other attributes may also be used. In step 152, it uses this set of histories to compute the expected size of the currently-scheduled backup job. Similarly, to compute rate, server 112 identifies in step 154 a set of relevant histories from repository 120 that have specified the same target storage device as does the currently-scheduled backup job. This set may also be further refined to include only histories that share other attributes with the job to be estimated, as was just described. The latter set of histories may be unrelated to the former set, but may also include some of the same histories as does the former set. In step 156, server 112 uses the selected histories to compute the expected completion rate of the currently-scheduled backup job. Note that the same techniques may be used to estimate the size and completion rate of any job, whether or not the job is actually a currently-scheduled job.

The inventors hereof have discovered that computing size and rate independently and in this fashion achieves superior accuracy to merely attempting to compute expected completion time directly using a single set of histories. Improved results may also be achieved by using histories in each of the two sets whose start times are the same as or similar to the start time specified by the currently-scheduled backup job. Other attributes of the job to be estimated may also be used to select more relevant histories, as was described above.

In step 158, server 112 is now in a position to compute the expected completion time for the currently-scheduled backup job. It may do so, for example, by dividing the expected size (e.g. in gigabytes) by the expected completion rate (e.g. in gigabytes per unit time) and then adding the result to the start time of the currently-scheduled backup job. In step 158, estimator component 114 may make the computed expected completion time value available to scheduler component 112 for further use such as the uses described in FIG. 7.

Figure 7:
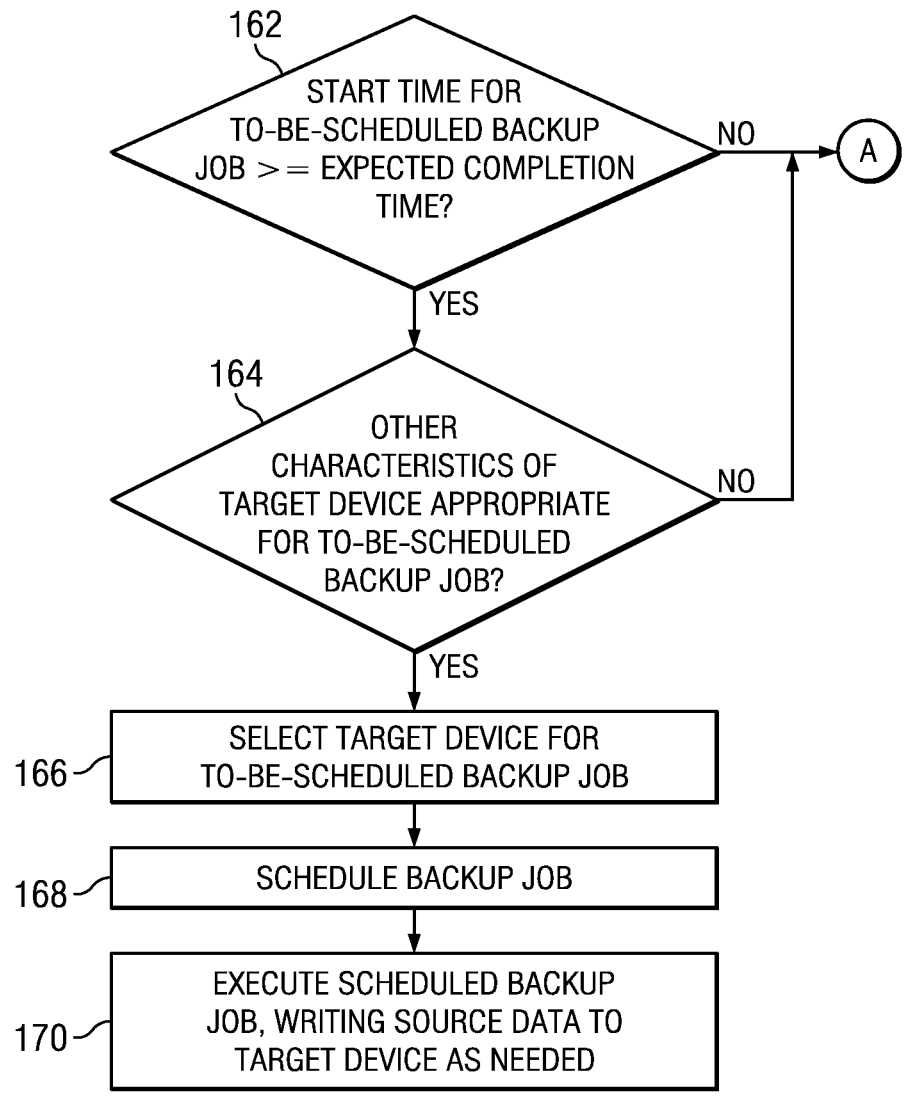
FIG. 7 is a flow diagram illustrating further example behavior of the components of the server of FIG. 2 when scheduling data backups according to embodiments of the invention.

Referring now to FIG. 7, scheduler 112 may determine in step 162 whether a start time specified by to-be-scheduled backup job 118 is greater than or equal to the computed expected completion time. If not, then it would be inappropriate to schedule job 118 on the same target device as is being used by the currently-scheduled backup job. In that instance, control may return to step 148 and another currently-scheduled backup job may be selected for investigation. But if the start time for the to-be-scheduled job is later than the just-computed expected completion time, then control may continue with step 164. In step 164, scheduler 112 determines whether the other characteristics of the target device are also appropriate for the to-be-scheduled backup job. For example, it may determine whether the target device is of the appropriate type, has the appropriate expected speed and has adequate capacity to receive data from the new job. (For efficiency, the considerations in step 164 may also be employed in selecting among the currently-scheduled backup jobs to be investigated.) If the target device is not appropriate, then control may resume at step 148 with another currently-scheduled backup job. But if it is, then scheduler 112 in step 166 may select the target device of the currently-scheduled backup job for the new backup job. In step 168, it may then schedule the new job accordingly. In step 170, it may execute the job by conventional means, writing some or all of the source data to the target device as needed.

Figure 8:
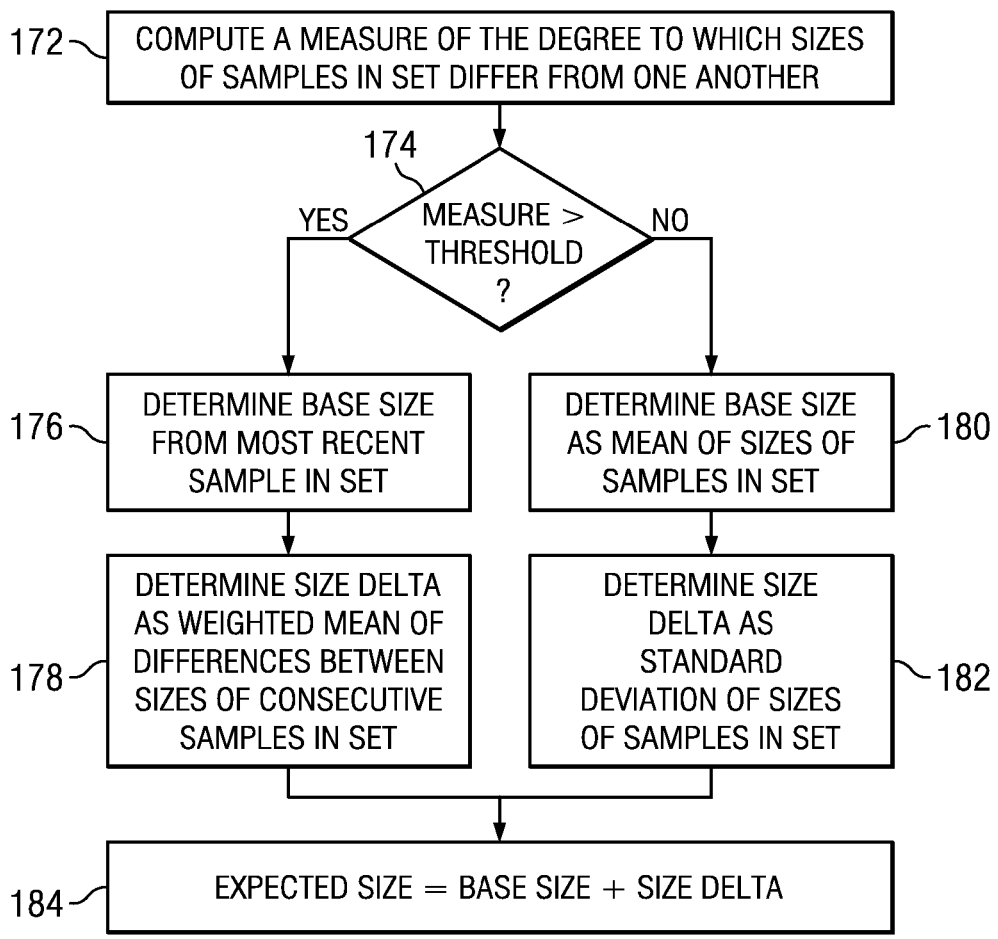
FIG. 8 is a flow diagram illustrating example behavior of the components of the server of FIG. 2 when determining an expected size of a data backup job according to embodiments of the invention.
Figure 9:
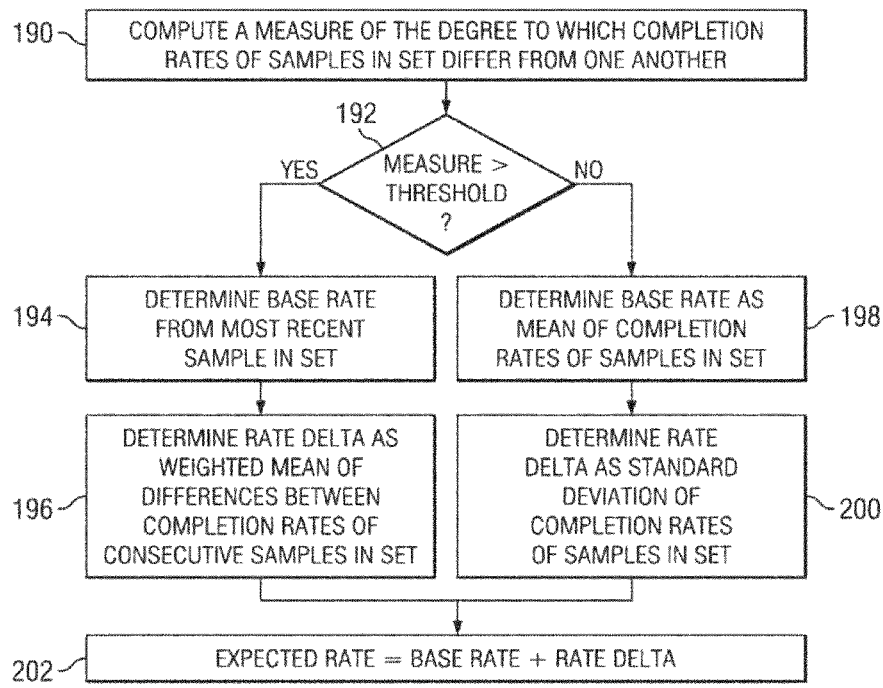
FIG. 9 is a flow diagram illustrating example behavior of the components of the server of FIG. 2 when determining an expected completion rate of a data backup job according to embodiments of the invention.

Either or both of the expected size and the expected completion rate computations described above may be performed using one of two different methods. The same method need not be used for both the size and the rate when computing the expected completion time for a given target device. Rather, one method may be used for computing the expected size and the other method may be used for computing the expected completion rate as appropriate. To determine which method to use in a given instance it is useful to compute, for a given selected set of histories 132 and for a given size or rate, some measure of the degree to which that parameter differs among the various samples in the relevant set of histories. FIG. 8 makes this more clear for the case of computing the expected size. FIG. 9 makes this more clear for the case of computing the expected completion rate.

Referring now to FIG. 8, in step 172 server 112 may compute a measure of the degree to which backup sizes vary among the histories in the set that was selected in step 150.

Figure 10:
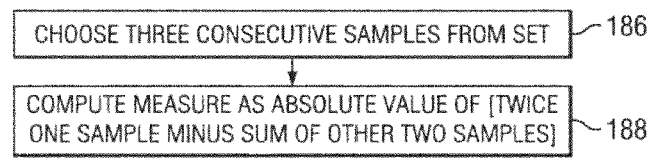
FIG. 10 is a flow diagram illustrating example behavior of the components of the server of FIG. 2 when computing a measure of the degree to which samples in a set of completed backup job histories differ from one another, according to embodiments of the invention.

One way of computing this measure is illustrated in more detail in FIG. 10. Referring briefly now to FIG. 10, in step 186 three consecutive samples or histories may be chosen from the set. In step 188, the measure may be computed as the absolute value of [twice one of the samples minus the sum of the other two samples]. For example, assume we have chosen three consecutive histories i−1, i, i+1. Let the backup sizes corresponding to those histories be $S_{i-1}$, $S_i$ and $S_{i+1}$ respectively. The measure may be computed then as $ABS[2S_i - S_{i-1} - S_{i+1}]$. In other embodiments, the measure may be computed as $ABS[2S_{i+1} - S_i - S_{i-1}]$. Still other variants may be employed. In some embodiments, the most recent three samples may be chosen for analysis. In other embodiments the measure may be computed for each sample in the set for which adequate data is available. In the latter embodiments, an aggregate of the computed measures may be employed in step 174 in lieu of a measure that corresponds to only a single point in time.

Referring again to FIG. 8, the computed measure may be compared in step 174 to a threshold value. If the computed measure exceeds the threshold, this may be taken to indicate that the backup sizes change abruptly from one sample to the next in the relevant set of histories. In this instance, the method of steps 176-178 may be employed to compute expected size. In the method of steps 176-178, the value computed for expected size can vary abruptly from the sizes of the most recent samples in the set of histories. In the method of steps 180-182, on the other hand, the value computed for expected size normally would not vary quite so abruptly from previous sizes. Thus the method of steps 176-178 may be referred to as the "swift" approach, while the method of steps 180-182 may be referred to as the "gradual" approach. The latter approach may be employed when the computed measure is not above the threshold. Moreover, in step 174, the choice as to which method to employ may be based on whether the measure has exceeded the threshold over a period of time (for numerous recent samples in the set of histories) rather than just for the most recent samples.

In step 176, a base size may be set equal to the backup size from the most recent history in the set. In step 178, a size delta may be computed as a weighted mean of the differences between the backup sizes of consecutive samples in the set. The nature of the weighting vectors that may be used to compute this weighted mean will be discussed in more detail below with reference to FIG. 11.

In step 180, the base size may be set equal to the mean of the backup sizes of the samples in the set. In step 182, the size delta is computed as the standard deviation of the backup sizes of the samples in the set.

In step 184, regardless of whether the swift or the gradual method was used to compute the base size and the size delta, the expected size is computed by summing the base size and the size delta.

Steps 190-202 of FIG. 9 are analogous to steps 172-184 of FIG. 8. In step 190, a measure may be computed to indicate the degree to which completion rate varies among the samples in the set that was identified in step 154. The techniques for doing so may be the same as those described above with reference to FIG. 10. In step 192, the measure may be compared with a threshold, either over a period of time as described above or for the most recent samples in the set. The threshold used in step 192 may differ from the one used in step 174. Depending on the outcome of the comparison, the swift method of steps 194-196 may be used to compute the expected completion rate, or the gradual method of steps 198-200 may be used to do so.

According to the swift method of steps 194-196, a base rate is set equal to the completion rate of the most recent sample in the relevant set of histories, and a rate delta is computed as a weighted mean of the differences between completion rates of consecutive samples in the set of histories. Again, weighting vectors appropriate for this operation will be discussed in more detail below.

According to the gradual method of steps 190-200, the base rate is set equal to the mean of the completion rates of the samples in the relevant set of histories. And the rate delta is computed as the standard deviation of the completion rates of the samples in the set of histories.

Regardless of which method was used to compute the base rate and the rate delta, the expected rate is computed in step 202 as the sum of the base rate and the rate delta.

Figure 11:
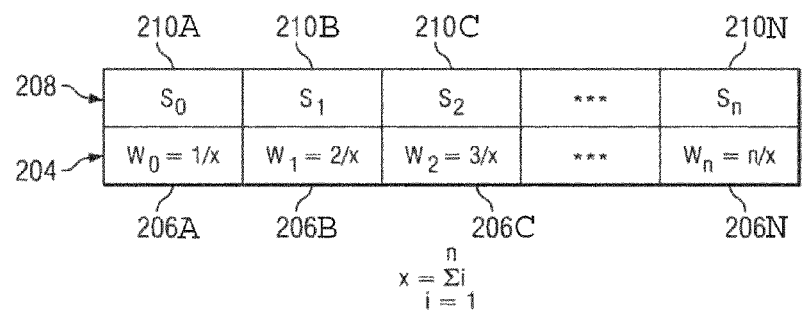
FIG. 11 is a block diagram illustrating an example weighting vector that may be used in embodiments of the invention.

Various weighting vectors may be used in the context of computing any of the weighted means described above. FIG. 11 illustrates one such vector 204 of weights 206A, 206B, 206C . . . 206N (collectively referred to herein as weight(s) 206). Each weight 206 is associated with one sample 210A, 210B, 210C . . . 210N (collectively referred to herein as sample(s) 210) from a set 208 of histories. In the illustration, weights 206 sum to 1. The smallest weight value W.sub.0 is associated with the oldest sample S.sub.0 in the set, and the largest weight value W.sub.n is associated with the most recent sample S.sub.n in the set. Each individual weight may be computed as shown in the cells of the drawing, where x is computed as the value of the arithmetic series from 1 to n, as shown. In this way, the weights vary linearly and emphasize the more recent samples over the older ones.

In other embodiments, the weighting vector may be constructed differently. For example, a weighting vector may be constructed either automatically or manually to give samples greater weight if their values are closer to the mean of the samples in the set, and to de-emphasize outlying samples whose values vary to a greater degree from the mean. Other weighting schemes may be employed as appropriate.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

What is claimed is:

1. A computer-executed method for scheduling data backups, comprising:

determining, using a processor, an expected size of a currently-scheduled backup and an expected rate of a currently-scheduled backup based on different first and second sets of backup histories, respectively, each backup history in the first set of backup histories specifying a data source associated with the currently-scheduled backup, and each backup history in the second set of backup histories specifying a target storage device associated with the currently-scheduled backup;

computing an expected completion time for the currently-scheduled backup based on the expected size, the expected rate, and a start time associated with the currently-scheduled backup, and scheduling a to-be-scheduled backup based on the expected completion time.

2. A computer-executed method as defined in claim 1, wherein the target storage device is a first target storage device and using the expected completion time to schedule the to-be-scheduled backup comprises:

determining whether a specified start time for the to-be-scheduled backup occurs at or after the expected completion time of the currently-scheduled backup; and scheduling the to-be-scheduled backup for either the first target storage device or a second target storage device based on the determination.

3. A computer-executed method as defined in of claim 1, wherein computing the expected size of the currently-scheduled backup comprises:
   determining a base size as a data size from a most recent backup history in the first set of backup histories;
   determining a size delta as a weighted mean of differences between data sizes of consecutive backup histories in the first set of backup histories; and
   summing the base size and the size delta.

4. A computer-executed method as defined in claim 1, wherein computing the expected size of the currently-scheduled backup comprises:
   determining a base size as a mean of data sizes of backup histories in the first set of backup histories;
   determining a size delta as a standard deviation of the data sizes of backup histories in the first set of backup histories; and
   summing the base size and the size delta.

5. A computer-executed method as defined in claim 1, wherein computing the expected rate comprises:
   determining a base rate as a completion rate from a most recent backup history in the second set of backup histories;
   determining a rate delta as a weighted mean of differences between completion rates of consecutive backup histories in the second set of backup histories; and
   summing the base rate and the rate delta.

6. A computer-executed method as defined in claim 1, wherein computing the expected rate comprises:
   determining a base rate as a mean of completion rates of backup histories in the second set of backup histories;
   determining a rate delta as a standard deviation of the completion rates of backup histories in the second set of backup histories; and
   summing the base rate and the rate delta.

7. A computer-executed method as defined in claim 1, further comprising:
   computing a measure of a degree to which samples in the first set of backup histories differ from one another; and
   responsive to the measure, choosing at least one of a first method or a second method to compute the expected size of the currently-scheduled backup.

8. A computer-executed method as defined in claim 7, wherein computing the measure comprises:
   choosing three consecutive backup histories from the first set of backup histories; and
   computing the measure as the absolute value of twice one of the three consecutive backup histories minus the sum of the other two consecutive backup histories.

9. A method as defined in claim 1, wherein at least one of the backup histories is in both of the first and second sets of backup histories.

10. A computer-executed method as defined in claim 1, wherein each of the backup histories in the first set of backup histories is associated with a respective partial backup if the currently-scheduled backup is associated with a first partial backup.

11. A tangible computer readable medium comprising computer readable instructions, which instructions, when executed, cause a computer to at least:
   determine an expected size of a currently-scheduled backup based on a first set of backup histories and an expected rate of a currently-scheduled backup using a second set of backup histories, each backup history included in the first set of backup histories specifying a data source associated with the currently-scheduled backup, each backup history included in the second set of backup histories specifying a target storage device associated with the currently-scheduled backup, and at least one of the backup histories being in either the first set or the second set of backup histories but not both of the first and the second sets of backup histories;
   compute an expected completion time for the currently-scheduled backup based on the expected size and the expected completion rate; and
   schedule a to-be-scheduled backup based on the expected completion time.

12. A tangible computer readable medium as defined in claim 11, wherein the expected size is computed by determining a base size as either a size of a most recent backup history in the first set of backup histories or a mean of sizes of backup histories in the first set of backup histories, determining a size delta as either a mean of size differences between consecutive backup histories in the first set of backup histories or a standard deviation of sizes of backup histories in the first set of backup histories, and summing the base size and the size delta.

13. A tangible computer readable medium as defined in claim 11, wherein the expected rate is computed by summing a base rate and a rate delta, the base rate being either a rate from a most recent backup history in the second set of backup histories or a mean of rates of backup histories in the second set of backup histories, and the rate delta being either a mean of rate differences between consecutive backup histories in the second set of backup histories or a standard deviation of rates of backup histories in the second set of backup histories.

14. A tangible computer readable medium as defined in claim 11, wherein at least one of the backup histories is in both the first and second sets of backup histories.

15. A tangible computer readable medium as defined in claim 11, wherein the instruction to schedule the to-be-scheduled backup comprises an instruction that further causes the computer to determine whether to schedule the to-be scheduled backup on the target storage device based on the expected completion time.

16. An apparatus for scheduling data backups, comprising:
   an estimator to:
      determine an expected size of a currently-scheduled backup using a first set of backup histories and an expected rate of a currently-scheduled backup using a second set of backup histories, the backup histories included in the first set of backup histories specifying a data source associated with the currently-scheduled backup, the backup histories included in the second set of backup histories specifying a target storage device associated with the currently-scheduled backup, and at least one of the backup histories being in either the first or the second set of backup histories but not both of the first and the second sets of backup histories; and
      compute an expected completion time for the currently-scheduled backup based on the expected size, the expected rate, and a start time associated with the currently-scheduled backup; and
   a scheduler to schedule a to-be-scheduled backup based on the expected completion time.

17. An apparatus as defined in claim 16, wherein the estimator is to compute the expected size by determining a base size to be a data size of a most recent backup history in the first set of backup histories; determining a size delta to be a weighted mean of differences between sizes of consecutive backup histories in the first set of backup histories, and summing the base size and the size delta.

18. An apparatus as defined in claim 17, wherein the estimator is further to determine the size delta using a linear weighting vector having component values that sum to 1, a smallest component value being associated with an oldest backup history in the first set of backup histories, and a largest component value being associated with a most recent backup history in the first set of backup histories.

19. An apparatus as defined in claim 16, wherein the estimator is to compute the expected rate by determining a base rate as a completion rate from a most recent backup history in the second set of backup histories, determining a rate delta as a weighted mean of differences between completion rates consecutive backup histories in the second set of backup histories, and summing the base rate and the rate delta.

20. An apparatus as defined in claim 16, wherein at least one of the backup histories is in both of the first and second sets of backup histories.

* * * * *

UNITED STATES PATENT AND TRADEMARK OFFICE
CERTIFICATE OF CORRECTION

PATENT NO. : 8,566,287 B2
APPLICATION NO. : 12/748467
DATED : October 22, 2013
INVENTOR(S) : Ajay Bansal et al.

Page 1 of 1

It is certified that error appears in the above-identified patent and that said Letters Patent is hereby corrected as shown below:

On the title page, item (75), Inventors, in column 1, line 3, delete "Subramariam" and insert -- Subramaniam --, therefor.

In the Claims:

In column 7, line 4, in Claim 3, delete "in of" and insert -- in --, therefor.

In column 8, lines 39-40, in Claim 15, delete "to-be scheduled" and insert -- to-be-scheduled --, therefor.

In column 8, line 66, in Claim 17, delete "histories;" and insert -- histories, --, therefor.

In column 9, line 14, in Claim 19, delete "rates" and insert -- rates of --, therefor.

Signed and Sealed this
Thirty-first Day of December, 2013

Margaret A. Focarino
*Commissioner for Patents of the United States Patent and Trademark Office*